United States Patent
Higuchi (10) Patent No.: US 7,151,563 B2
(45) Date of Patent: Dec. 19, 2006

(54) DIGITAL CAMERA AND WHITE BALANCE ADJUSTING METHOD

(75) Inventor: Masayu Higuchi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 799 days.

(21) Appl. No.: 10/157,698

(22) Filed: May 29, 2002

(65) Prior Publication Data

US 2003/0011686 A1    Jan. 16, 2003

(30) Foreign Application Priority Data

Jun. 1, 2001   (JP) ............................. 2001-167205
May 22, 2002   (JP) ............................. 2002-147305

(51) Int. Cl.
    *H04N 9/73*   (2006.01)
(52) U.S. Cl. .............................. 348/223.1; 348/229.1; 348/228.1
(58) Field of Classification Search ............ 348/221.1, 348/222.1, 223.1, 226.1, 228.1, 227.1, 229.1, 348/244, 207.1, 208.15, 333.02, 333.04
    See application file for complete search history.

(56) References Cited

U.S. PATENT DOCUMENTS 4,899,212 A *  2/1990  Kaneko et al. .......... 348/220.1
5,479,206 A * 12/1995  Ueno et al. ............. 348/211.5
6,862,039 B1 *  3/2005  Shimizu .................. 348/223.1

FOREIGN PATENT DOCUMENTS

| JP | 06-233333 A | 8/1994 |
| JP | 07-162872 A | 6/1995 |
| JP | 08-065689 A | 3/1996 |

OTHER PUBLICATIONS

Document Translation of JP 08-065689 A.*

* cited by examiner

*Primary Examiner*—Yivek Srivastava
*Assistant Examiner*—Nelson D. Hernandez
(74) *Attorney, Agent, or Firm*—Frishauf, Holtz, Goodman & Chick, P.C.

(57) ABSTRACT

A digital camera has an adjustment value creating part configured to create an adjustment value for adjusting a white balance of an image, and an adjusting part configured to adjust the white balance of the image based on an adjustment value output from the adjustment value creating part. The adjustment value creating part comprises a calculating part configured to calculate a first adjustment value based on image data obtained by taking a subject image, an evaluating part configured to evaluate a reliability of the first adjustment value, an adjustment value correcting part configured to correct the first adjustment value based on input data when the evaluating part evaluates that the reliability of the first adjustment value is low, and create a second adjustment value, and an adjustment value outputting part configured to output the second adjustment value to the adjusting part.

17 Claims, 6 Drawing Sheets

| | Single shot mode | Rapid sequence mode |
|---|---|---|
| Automatic mode AWB | ○ | ○ |
| Semi-automatic mode SAWB | ○ | × |
| Manual mode MWB | ○ | ○ |

FIG. 9

DIGITAL CAMERA AND WHITE BALANCE ADJUSTING METHOD

CROSS-REFERENCE TO RELATED APPLICATION

This application is based upon and claims the benefit of priority from the prior Japanese Patent Applications No. 2001-167205, filed Jun. 1, 2001; and No. 2002-147305, filed May 22, 2002, the entire contents of which are incorporated herein by reference.

BACKGROUND OF THE INVENTION

1. Field of the Invention

The present invention relates to a digital camera having an automatic white balance (AWB) adjusting function for automatically adjusting white balance and to a white balance adjusting method.

2. Description of the Related Art

In recent years, electronic cameras, that is, digital cameras, which converts a subject image by an electronic image pickup means to image data and record the image data on a recording medium, have been widely accepted. The digital camera has an adjusting function of reproducing a subject's white color called a white balance. By adjusting white balance of a captured image it is possible to obtain an image of proper color.

An ordinary digital camera has, as a white balance adjusting mode, an automatic (AWB) mode and a manual (MWB) mode. The AWB mode constitutes a mode of automatically adjusting the white balance to generally allow the white color of a captured subject to be correctly reproduced without the user's being aware of the white balance. The MWB mode constitutes a mode of allowing a specific white balance corresponding to the kinds of normal light sources used at the time of image capturing, such as sunlight, fluorescent lamp and electric bulb, to be set by manual operation of the user.

The AWB mode of automatically performing this white balance adjustment is very convenient to achieve a programmed photographing mode, or a simplified photographing mode, for simplifying image capturing operation of a digital camera.

However, the AWB mode does not work effectively under every image capturing condition and there occur cases where color reproduction of a captured subject's image is not adequate. In the case where, in particular, a subject has no white color or has extremely less white color, the white balance is sometimes upset. Stated in more detail, this applies to the case where, for example, an image is taken against a background of wholly green turf. Or even if a subject is white in color, an incorrect color decision is sometimes made depending upon the kinds of light sources at the capturing of the subject image and, in this case, the white balance is sometimes upset.

Generally, in the case of the digital camera, a reference light source under which color can be correctly reproduced is under sunlight in fair weather and has a color temperature of about 5500K. In the case where a subject image is captured in the room, it is often done under an electric bulb with a color temperature of about 3000K lower than that of the reference light source or under a light source such as a fluorescent lamp with a color temperature higher than that of the reference light source. In these situations, the white balance can be adjusted under manual mode. It is, however, not easy for the general user to achieve this and there is a high possibility that the user will perform an erroneous operation.

A system has been proposed under which comparison is made between a white balance adjustment value serving as a reference and an adjustment value under manual mode and the result of comparison is informed to the user and, if a comparison result falls out of the allowable range, a warning is issued or the capturing of an image is inhibited (Jpn. Pat. Appln. KOKAI Publications Nos. 7-162872 and 8-65689). In this system, there is no guarantee that the reference white balance adjustment value is optimal. Further, it is not possible to adjust the white balance of an image taken. Further, through the issuance of a warning or the inhibition of image capturing, there is also a problem of losing any shutter release moment.

Another, proposal has also been made under which the white balance can be manually made with monitoring an adjusted result of the white balance on the monitor (Jpn. Pat. Appln. KOKAI Publications No. 6-233333). These prior techniques perform the white balance calibration and cannot be easily used by the general user.

BRIEF SUMMARY OF THE INVENTION

It is accordingly the object of the present invention to provide a digital camera capable of properly adjusting white balance by a simple operation without losing any shutter release moment, even under an image capturing condition in which AWB mode is effectively unavailable, and a white balance adjusting method.

According to a first aspect of the present invention there is provided a digital camera comprising an adjustment value creating part configured to create an adjustment value for adjusting a white balance of an image; and an adjusting part configured to adjust the white balance of the image based on an adjustment value output from the adjustment value creating part, the adjustment value creating part comprising a calculating part configured to calculate a first adjustment value based on image data obtained by taking a subject image, an evaluating part configured to evaluate a reliability of the first adjustment value, an adjustment value correcting part configured to correct the first adjustment value based on input data when the evaluating part evaluates that the reliability of the first adjustment value is low, and create a second adjustment value, and an adjustment value outputting part configured to output the second adjustment value to the adjusting part.

According to a second aspect of the present invention there is provided a digital camera comprising a first storing part configured to temporarily store image pickup data obtained by taking a subject image;

a second storing part configured to temporarily store the processed image data by creating a first white balance adjustment value based on the taken image data, and performing image processing by the first white balance adjustment value; an operating part configured to perform fine adjustment of the first white balance adjustment value obtained based on the taken image data; a control part configured to create a second white balance adjustment value based on an operation of the operating part, process the image data, which is read out from the first storing part, by the white balance adjustment value, and store the processed image data in the second storing part; a confirming part configured to confirm the white balance adjustment value created by the operation of the operating part; and an outputting part configured to, when the white balance adjustment value is confirmed by the confirming part, output the image data stored in the second storing part to a loaded recording medium.

According to a third aspect of the present invention there is provided to a white balance adjusting method comprising an adjustment value creating step of creating an adjustment value for adjusting a white balance of an image; and an adjusting step of adjusting the white balance of the image based on the measured value created in the adjustment value creating step, the adjustment value creating step comprising a calculating step of calculating a first adjustment value based on image data obtained by taking a subject image, an evaluating step of evaluating a reliability of the first adjustment value, an adjustment value correcting step of, when it is evaluated in the evaluating step that the reliability of the first adjustment value is low, correcting the first adjustment value based on input data and creating a second adjustment value, and an adjustment value outputting step of outputting the second adjustment value for the adjusting step.

According to a fourth aspect of the present invention, there is provided a white balance adjusting method comprising a first storing step of temporarily storing image data, which is taken from a subject image, in a first storing part; a second storing step of temporarily storing the processed image data in a second storing part by creating a first white balance adjustment value based on the taken image data, and performing image processing by the first white balance adjustment value; an operation step of performing fine adjustment of the first white balance adjustment value obtained based on the taken image data; a control step of creating a second white balance adjustment value based on an operation in the operating step, performing image processing on the image data, which is read out from the first storing means, based on the white balance adjustment value, and storing the processed image data in the second storing part; a confirming step of confirming the white balance adjustment value created by the operation in the operation step; and an outputting step of, when the white balance adjustment value is confirmed in the confirming step, outputting the image data which is based on the image data stored in the second storing means to a loaded recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
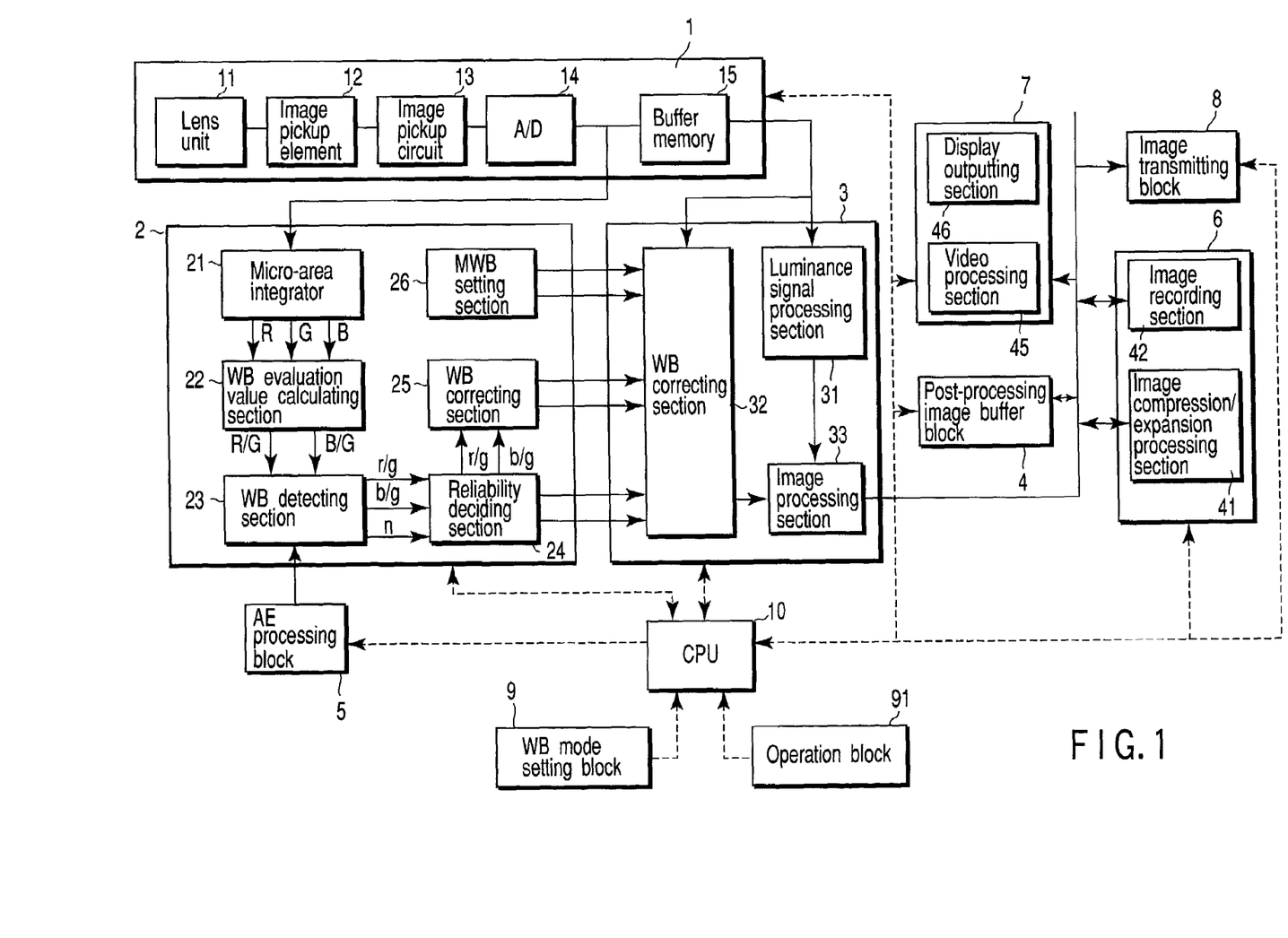
FIG. 1 is a block diagram showing an arrangement of a digital camera according to the present invention.

FIG. 1 is a block diagram showing an arrangement of a digital camera according to the present invention.

The present digital camera comprises an image pickup block 1, a white balance (WB) block 2, an image processing block 3, a post-processing image buffer block 4, an automatic exposure (AE) processing block 5, a recording block 6, a display block 7, an image transmitting block 8, a WB mode setting block 9, an operation block 91 and CPU 10.

The image pickup block 1 has a lens unit 11, an image pickup element 12, an image pickup circuit 13, an analog-to-digital converter 14 and a buffer memory 15.

The lens unit 11 has a zoom lens, an aperture section, an auto-focus lens, and so on. The image pickup element 12 is comprised of a CCD of normally a few millions of pixels and converts a subject image which has been formed by the lens unit 11 to an electrical signal. The image pickup circuit 13 mainly performs signal processing, such as AGC (automatic gain control) processing and CDS (correlation double sampling) processing. The analog-to-digital converter 14 converts the analog image pickup signal which has been output from the image pickup circuit 13 to digital image data. The buffer memory 15 temporarily stores the converted image data.

The WB block 2 performs calculation processing for calculating a WB adjustment value for adjusting the white balance from the captured image data. The WB block 2 comprises a micro-area integrator 21, a WB evaluation value calculating section 22, a WB detecting section 23, a reliability deciding section 24, a WB correcting section 25 and an MWB setting section 26.

The micro-area integrator 21 divides the image into a plurality of micro-areas and calculated RGB data of color data at each area. The WB evaluation value calculating section 22 calculates WB factors (R/G, B/G) at each micro-area from the RGB data calculated by the micro-area integrator 21. The WB detecting section 23 calculates WB adjustment values (r/g, b/g) based on the WB factors as well as luminance information from the AE processing block 5. The reliability deciding section 24 decides whether or not the WB adjustment value is a correct value. The WB correcting section 25 supports such an operation that, if the WB adjustment value is not correct, the user fine-adjusts the WB adjustment value and makes a correction. The MWB setting section 26 supports such an operation as to allow the user to manually set an initially set value as the WB adjustment value before image capture.

The image processing block 3 variously corrects the image data obtained at the image pickup block 1 and creates proper image data. The image processing block 3 comprises a luminance signal processing section 31, a white balance (WB) correcting section 32 and an image processing section 33.

The luminance signal processing section 31 performs processing for generating digital luminance data (Y data) from the image data. The WB correcting section 32 performs WB correction processing on the image data on the basis of the WB adjustment value obtained from the reliability deciding section 24 or WB correcting section 25 or MWB setting section 26. The image processing section 33 applies color matrix correction, γ correction, LPF color separation processing, YC conversion, etc., to the WB-corrected image data and generates digital coding data (Y data, C data).

The post-processing image buffer block 4 comprises a built-in memory for temporarily buffering the image data.

The AE processing block 5 has the function of calculating the subject's luminance information for automatic exposure processing. The calculated luminance information is output to the WB detecting section 23 for calculating a WB adjustment value.

The recording block 6 comprises an image compression/expansion section 41 and an image recording section 42 and records a compression-processed image on a recording medium such as a memory card.

The image compression/expansion processing section 41 receives the Y data and C data from the image processing section 33, performs the image compression processing, for example under the JPEG system and delivers an output to the image recording section 42. The image recording section 42 records the compressed image to the recording medium. It is to be noted that, in a way opposite to this operation, the image compression/expansion processing section 41 performs image expansion processing on the compressed data output from the image recording section 42.

The display block 7 comprises a video processing section 45 and a display outputting section 46.

The video processing section 45 converts the Y data and C data which are output from the image processing section 33 to an analog luminance signal (Y signal) and color signal (C signal) and delivers an output to the display output section 46. The display outputting section 46 displays the captured image and a menu screen on an LCD (Liquid Crystal Display) monitor.

The image transmitting block 8 has the function of transmitting the captured image to an outside, by wired communication or wireless communication.

The WB mode setting block 9 has the function of prompting the user to selectively set automatic mode, manual mode or semi-automatic mode as an input and transmitting the input WB adjusting mode to the CPU 10.

The operation block 91 comprises switches, a cross key and so on which are used when the user performs an input operation.

The CPU 10 generally controls the operations of the respective blocks including the WB adjusting operation according to the present invention.

Figure 2:
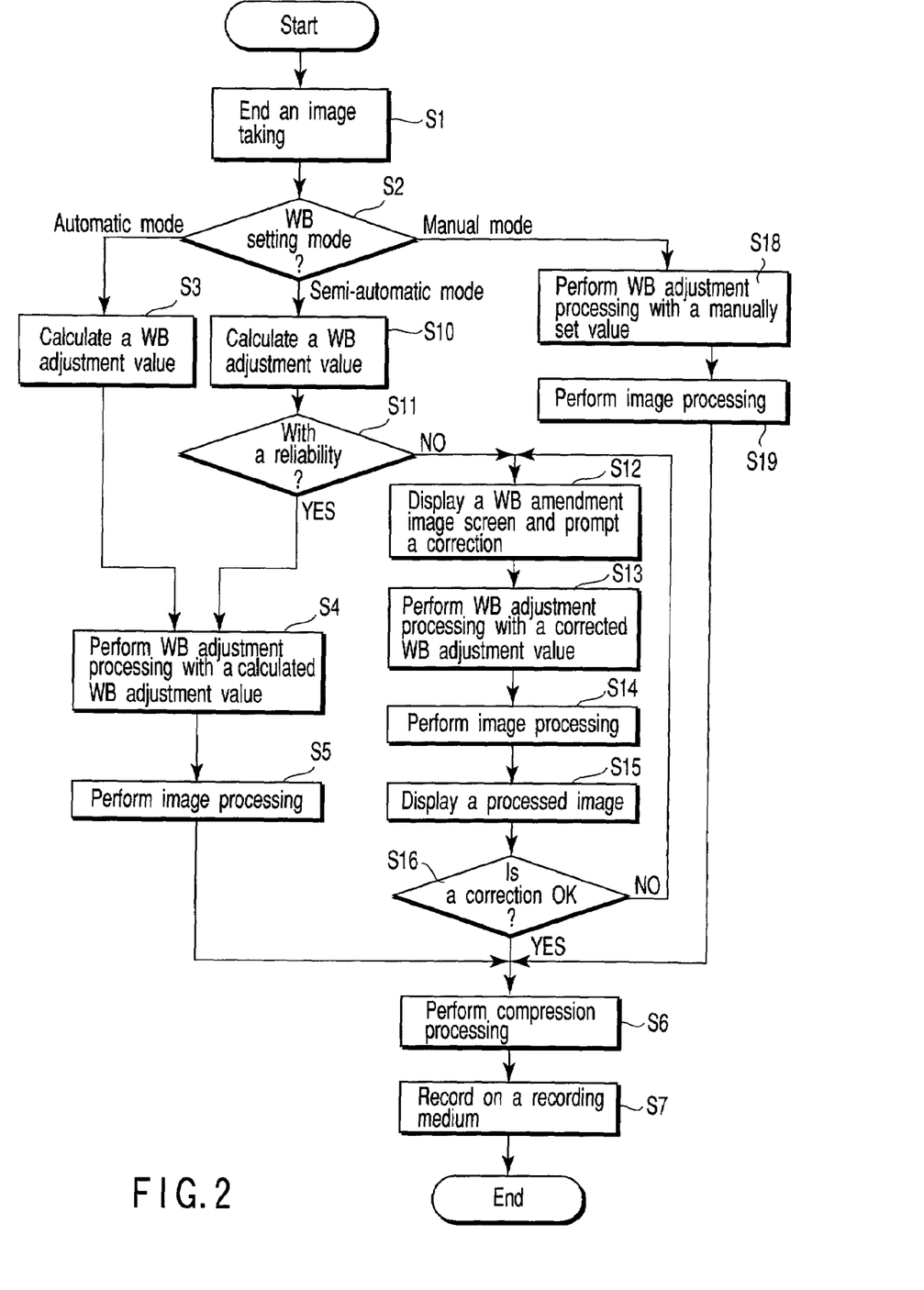
FIG. 2 is a flow diagram showing the general steps of WB adjustment processing according to the present invention.

FIG. 2 is a flowchart showing a general procedure of the WB adjusting processing according to the present invention. The WB adjusting operation according to the present invention will be explained below with reference to FIG. 1 and mainly to the flowchart of FIG. 2.

When image capture is started, in step S1, by the operation of a release button on the digital camera, the image data of the subject is obtained by the operation of each part of the image pickup block 1. The image data is stored in the buffer memory 15 and the image capture is ended.

Then the WB adjusting mode is checked, in step S2. The WB adjusting mode includes automatic mode, manual mode and semi-automatic mode. The user can set their WB adjustment by selecting any of the modes.

Figure 3:
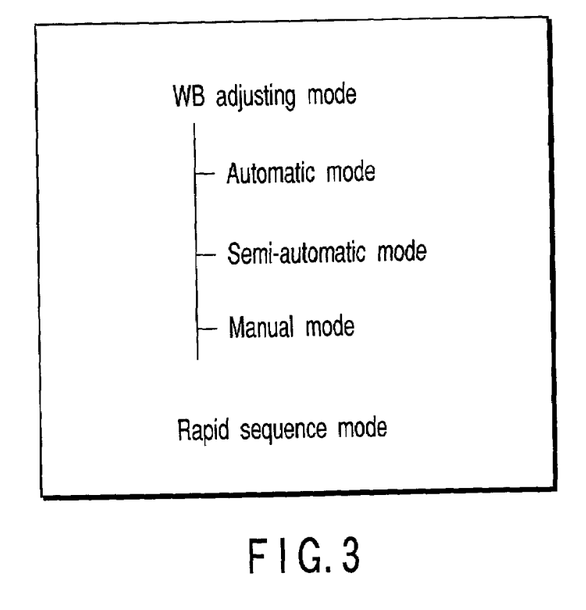
FIG. 3 shows a menu screen for setting a WB adjusting mode.

FIG. 3 shows the menu screen for setting the WB adjusting mode. The WB mode setting block 9 displays the menu screen on the LCD monitor. The user-selected WB adjusting mode is obtained through the menu screen and the result is transmitted to the CPU 10.

It is to be noted that the selection of the WB adjusting mode may be initially set as an input before starting an image capturing operation or be set on the captured image after the image capturing operation has been ended.

In the case where the automatic mode is set, in step S2, the operation of calculating the WB adjustment value is made at each part of the WB block 2 so as to perform AWB adjustment processing, in step S3.

First, the image data stored in the buffer memory 15 is read onto the micro-area integrator 14 and its image is divided into a plurality of micro-areas.

Figure 4:
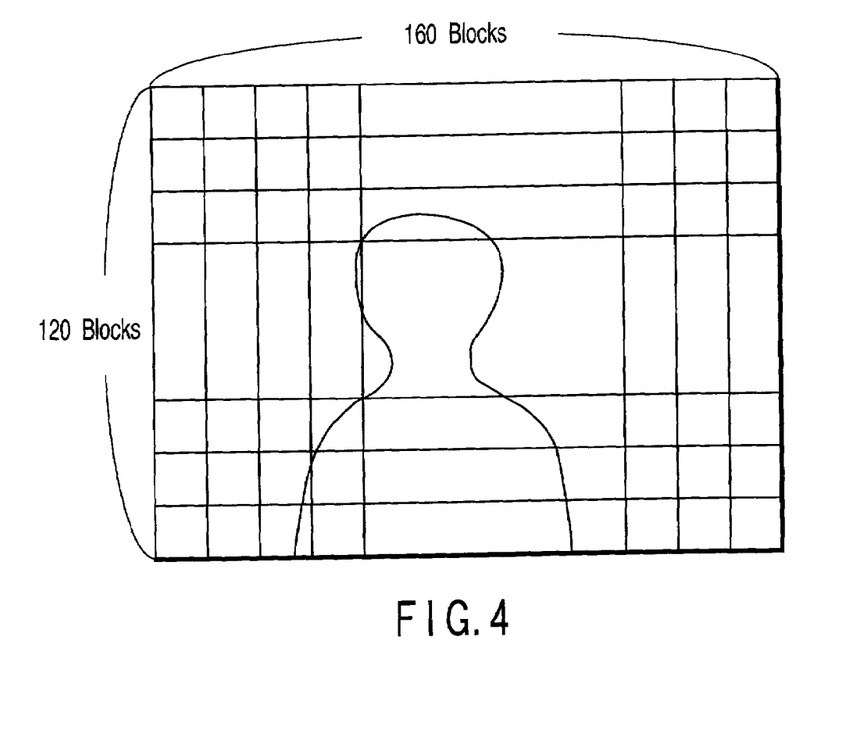
FIG. 4 is a view showing an image divided into micro-areas.

FIG. 4 is a view showing the image divided into the micro-areas.

In the present embodiment, the image comprises a total number of 19200 micro-areas of 160 blocks in width×120 blocks in height.

Then, the micro-area integrator 14 calculates RGB data of color data at each micro-area.

Figure 5:
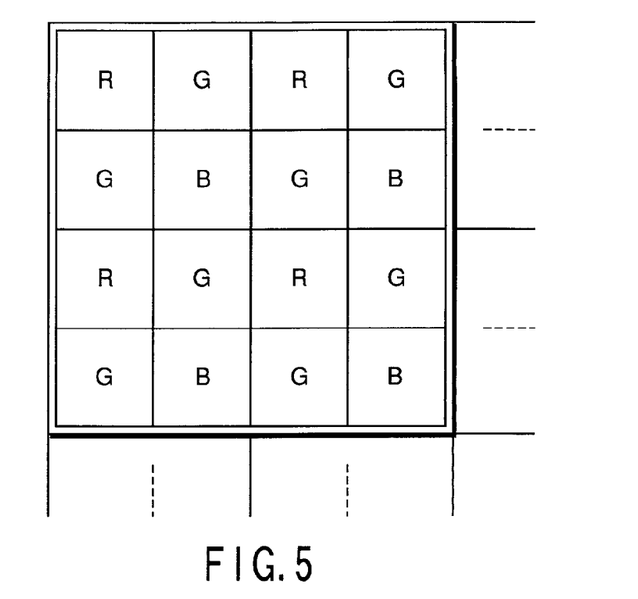
FIG. 5 is a view showing an array of color data within the micro-area.

FIG. 5 is a view showing an array of the color data in the micro-areas.

In the embodiment of the present invention, the image data is comprised of a Bayer arrangement. The image data is of such a type as to have one 4×4 area and 4 sets with 4 color data of R-G-G-B as one set. The micro-area integrator 14 calculates, at each micro-area, color data integrating values ($R_{sum}$, $G_{sum}$, $B_{sum}$) with the use of an equation (1) below.

$$R_{sum}=\Sigma R,\ G_{sum}=(\Sigma Gi)/2,\ B_{sum}=\Sigma B \qquad (1)$$

provided that R, G, B show the color data included in the respective pixel.

The thus calculated color data integrating value at each micro-area is passed over to the WB evaluation value calculating section 22.

The WB evaluation value calculating section 22 calculates WB factors ($R_{sum}/G_{sum}$, $B_{sum}/G_{sum}$) at each area from the color data integrating value at each micro-area. Thus, 19200 sets of the WB factors are calculated in the present embodiment.

Then, the WB detecting section 23 calculates WB adjustment values (r/g, b/g) based on the WB factors and luminance information from the AE processing block 5.

Figure 6:
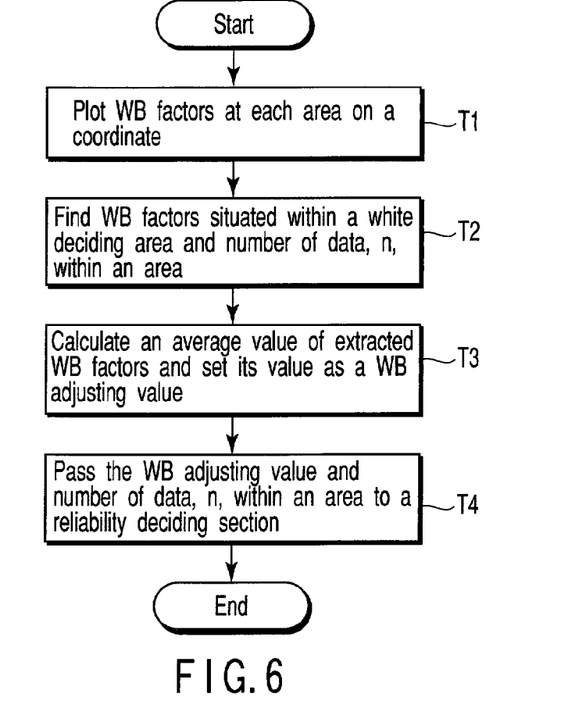
FIG. 6 is a flow diagram showing general steps of finding the WB adjustment value.
Figure 7:
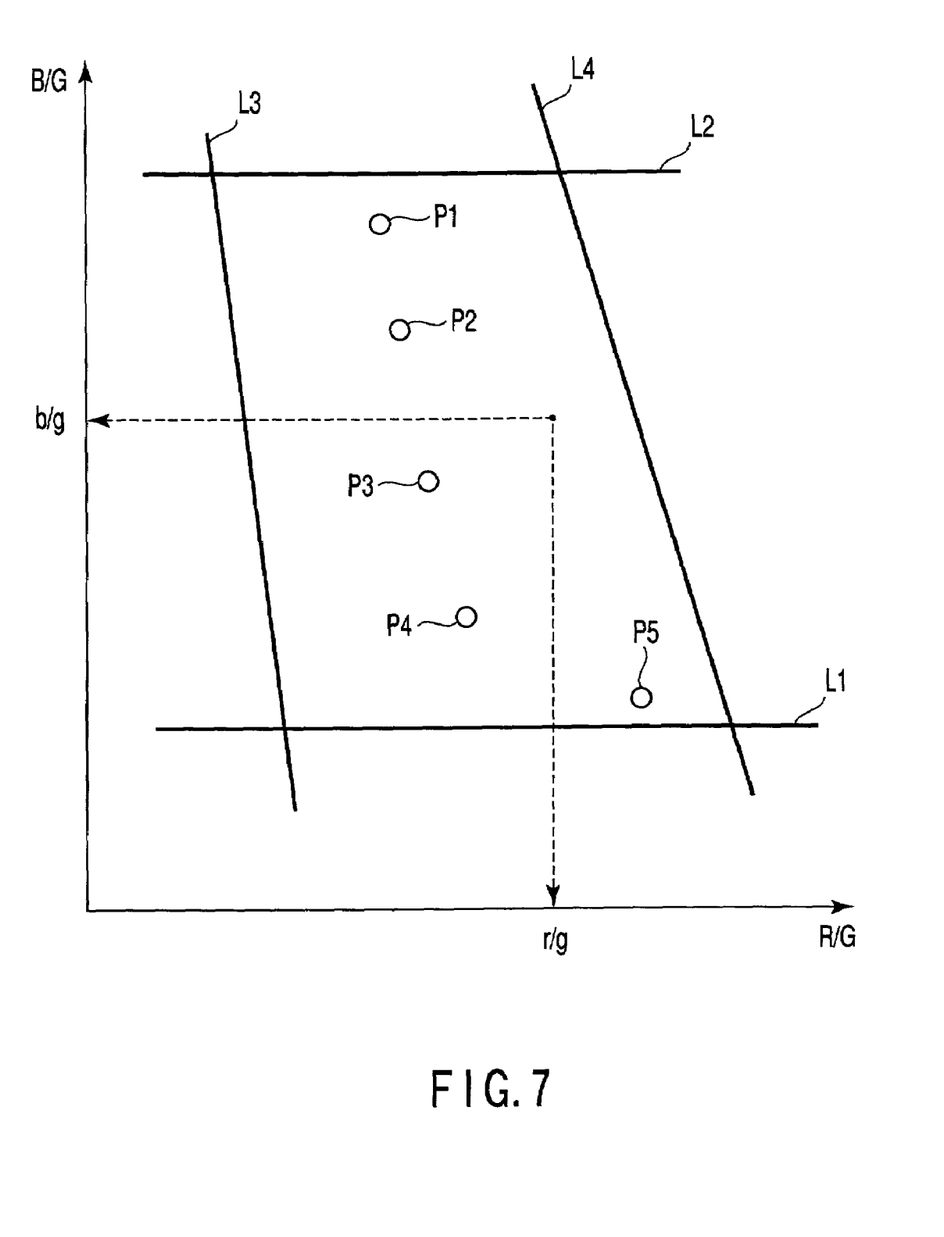
FIG. 7 is a view for explaining a method of finding the WB adjustment value.

FIG. 6 is a flowchart showing a general procedure for calculating the WB adjustment value and FIG. 7 is a view for explaining the method for calculating the WB adjustment value.

FIG. 7 shows the coordinate in which a vertical axis shows the B/G of the WB factor and a horizontal axis shows the R/G of the WB factor. In the coordinate plane, predetermined reference lines L1 to L4 are plotted and an area enclosed by the four reference lines is defined as a white deciding area.

In step T1, the WB detecting section 23 plots, on this coordinate, the WB factors ($R_{sum}/G_{sum}$, $B_{sum}/G_{sum}$) at each area calculated by the WB evaluation value calculating section 22. The WB factors ($R_{sum}/G_{sum}$, $B_{sum}/G_{sum}$) situated within an area of a white deciding area and the number of data, n, are extracted, in step T2.

Then, in step T3, the average value of the extracted WB factors is calculated by equations (2) and (3) and this value is set as the WB adjustment values (r/g, b/g).

$$r/g = (\Sigma R_{sum}/G_{sum})/n \quad (2)$$

$$b/g = (\Sigma B_{sum}/G_{sum})/n \quad (3)$$

And, in step T4, the calculated WB adjustment value and number of data, n, in the area are passed over to the reliability deciding section 24.

The WB adjustment value calculated here is handled as a white color reference value, but use can be made of not only those values calculated based on the image pickup data as in the embodiment but also a predetermined value. For example, points P1 to P5 shown in FIG. 7 show reference WB adjustment values adopted at an image capture under the illumination level of shade, cloudy conditions, sunlight, a fluorescent lamp and an electric bulb.

It is to be noted that the WB detecting section 23 receives a luminance value calculated by the AE processing block 5 and changes the above-mentioned white deciding area in accordance with the luminance value. In the case where, for example, the luminance value is greater than a predetermined value, the capture of an image is decided as not being done under an artificial light source and the reference line L1 is up-shifted by a predetermined amount in a parallel way.

The WB adjustment value thus calculated is sent through the reliability deciding section 24 to the WB correcting section 32. In step S4, the WB correcting section 32 performs WB adjusting processing based on the WB adjustment value. Stated in more detail, with respect to all the pixels, R and B color data of the image data are divided by the r/g and b/g and, by doing so, the resultant values are newly used as the R and B color data. And this processing is done on all the pixels. It is to be noted that, in the AWB mode, the reliability deciding section 24 makes no decision and outputs the input WB adjustment value to the WB correcting section 32.

In step S6, the WB adjusted image data are subjected to various kinds of image processing at the image processing block 3 and compression processed at the image compression/expansion processing 41. In step S7, the compression-processed image data is recorded by the image recording section 42 on the recording medium such as a memory card. Further, after being subjected to various kinds of image processing at the image processing block 3, the WB adjusted image data is sent from the video processing section 45 to the display outputting section 46 where the captured image is displayed on the LDC monitor.

Then, in the case where, in step S2, the semi-automatic mode is set, in step S10 the WB adjustment value is calculated as in the case of the automatic mode. That is, as set out above, the micro-area integrator 21, WB evaluation value calculating section 22 and WB detecting section 23 are operated to calculate the WB adjustment value and output it to the reliability deciding section 24.

Further, in the semi-automatic mode, the reliability deciding section 24 decides the reliability of the WB adjustment value in step S11. For example, in the case where the number of data, n, within the white deciding area is greater than a predetermined value, the calculated WB adjustment value is decided as being higher in reliability while, in the case where the number of data, n, within the white deciding area is lower than the predetermined value, the WB adjustment value is decided as being lower in reliability.

If [YES] is specified, in step 11, that is, if the reliability deciding section 24 decides that the reliability of the calculated WB adjustment value is higher, shifting is made to the same operation as in the automatic mode. In step S4, the reliability deciding section 24 outputs the calculated WB adjustment value to the WB correcting section 32 where the WB adjusting processing is performed based on the WB adjustment value. In step S5, the WB adjusted image data is image-processed by the image processing section 33. In step S6, the compression processing is done by the image compression/expansion section 41. In step S7, the compression-processed image data is recorded by the image recording section 42 on the recording medium such as a memory card. Further, the WB adjusted image data is sent from the video processing section 45 to the display outputting section 46 where the captured image is displayed on the LCD monitor.

If [NO] is specified, in step 11, that is, if the reliability deciding section 24 decides that the reliability of the calculated WB adjustment value is lower, the calculated WB adjustment value is not output to the WB correcting section 32 and is output to the WB correcting section 25. And the processing thus far done automatically is temporarily interrupted and shifting is made to the WB adjustment value correction processing by the user.

The WB correcting section 25 passes the WB adjustment value to the WB correcting section 32 and the image data stored in the buffer memory 15 is image-processed at the image processing block 3 and, after being image-processed, stored in the buffer memory 4. At this point in time, in step S12, recording is not made on the recording medium such as a memory card and an image display only is made. Further, an corrected input screen is displayed on the LCD monitor, thus prompting the user to correct the WB adjustment value.

Figure 8:
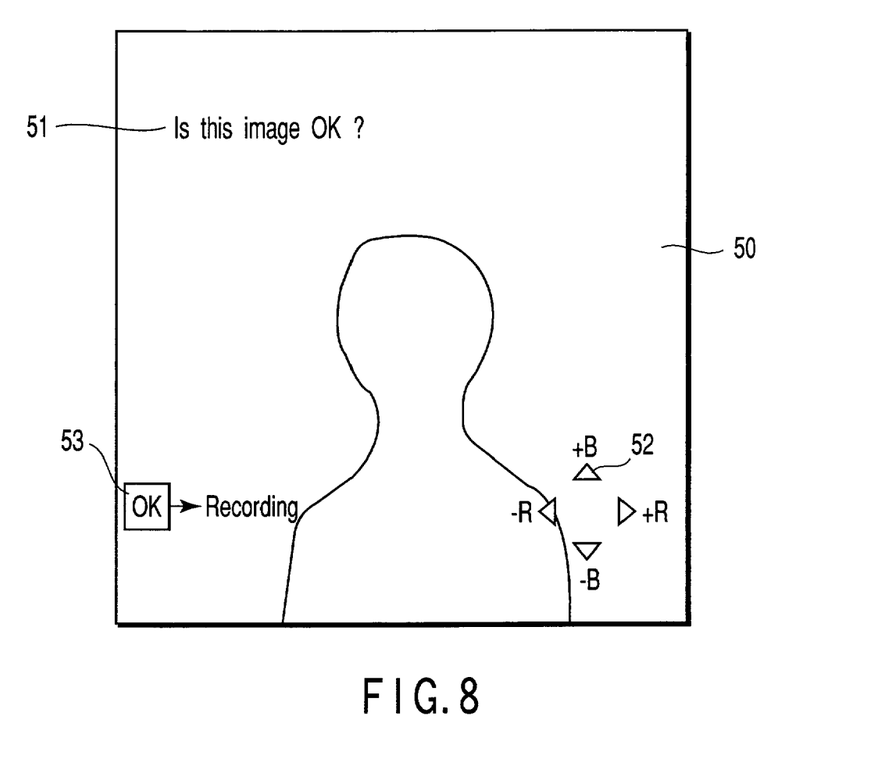
FIG. 8 is a view showing a correction input image screen.

FIG. 8 is a view showing a correction input image screen.

The image-processed captured image 50 and a message 51 indicating, for example, "Is this image OK" to the user are displayed on the LCD monitor. Further, an operation display 52 for correcting the WB adjustment value and an operation complete button 53 are displayed on the LCD monitor.

When, in accordance with an operation display 52, the user depresses the cross operation key of the operation block 91 in a −B direction on the camera, the b/g of the WB adjustment value is incremented by 1 and a corresponding incremented value is sent to the WB correcting section 32.

In step S13, the WB correcting section 32 performs WB adjusting processing based on the WB adjustment value and, in step S14, further image processing is performed. In step S15, the WB adjusted image data is displayed on the LCD monitor.

If [NO] is specified, in step 16, that is, if the user feels further adjustment necessary when viewing the WB adjusted image, the sequential steps S12 to S15 are performed.

If [YES] is specified, in step 16, that is, if the user finds the WB adjusted image [OK], when the operation complete button 53 is operated, then the processed image data is regarded as being finally confirmed and shifting is made to the same operation as in the automatic mode.

That is, in step S6, the image data stored in the post-processing buffer memory 4 is compression-processed at the image compression/expansion processing section 41 and, in step S7, sent to the image recording section 42 where it is recorded in the recording medium.

In the case where a manual mode is involved, in step S2, that is, the manual mode is set, the WB adjustment is made, before an image capture, with a value initially set by the manual operation.

The MWB setting section 26 allows reads the capturing conditions set by the user. The capturing conditions include shade, cloudy, sunlight, the fluorescent lamp, the electric bulb and so on. And, as set out above, the WB adjustment value corresponding to the capturing conditions as shown in FIG. 7 are taken out and passed over to the WB correcting section 32.

In step S18, the WB adjusting section 32 performs WB adjusting processing based on the WB adjustment value set manually. In step S19, the WB adjusted image data is image-processed at the image processing section 33 and, in step S6, compression-processed at the image compression/expansion processing section 41. And, in step S7, the compression processed image data is recorded by the image recording section 42 on the recording medium such as a memory card. Further, the WB adjusted image data is sent from the video processing section 45 to the display outputting section 46 where the captured image is displayed on the LCD monitor.

In the semi-automatic mode of the present embodiment thus set out above, the image capturing is done and the WB is fine-adjusted based on the image data stored in the buffer memory 15 of a first memory means, so that there is no loss of a shutter release moment. Further, before recording, the WB can be confirmed and corrected. The WB fine-adjusted image data is stored in the post-processing image buffer block 4 of a second memory means. Thus, after the confirmation of the WB, compression processing can be done based on the image data of the post-processing image buffer block 4 and recording can be made on the recording medium. It is, therefore, possible to positively record desired image data.

That is, if the semi-automatic mode of the present embodiment is used in the case where the reliability of the WB adjustment value calculated in the normal automatic mode is decided as being lower, a captured image and operation button are displayed on the LCD monitor. Each time the user operates the operation button, a WB adjusted image is updated/displayed on the LCD monitor. It is, therefore, possible for the user to make WB adjustment by a simpler operation prior to recording the image data on the recording medium such as a memory card.

By the operation of the operation complete button 53, the operation is confirmed and an image WB adjusted with a positive value can be recorded on the recording medium such as a memory card.

Further, the present invention can be applied to a digital camera having the function of transmitting a captured image to the outside through a wireless communication function or a wired communication function. In the case where the semi-automatic mode is set, it is possible for the user to perform an OK operation and an image WB adjusted with a positive value can be transmitted on this digital camera.

Although, in the present embodiment, fine adjustment is manually made when no reliability of the WB adjusted value is secured, the present invention is not restricted thereto and, at a time of the semiautomatic mode, it is possible to, after image capture, display an corrected input image screen at all times so that the users decision is waited for it.

As a result, the user can capture an image without performing any complex setting and, if the user decides its WB as being improper or if there is any warning to that effect, the user can perform that setting operation.

Further, even if, in the present invention, the capturing conditions are such that no automatic mode functions effectively, it follows that, first, an image capturing is effected and then the WB adjustment is made. Since a captured image is stored in the buffer memory 15, it is possible to avoid any loss of a shutter release moment and any situation of an image capturing failure.

Figure 9:
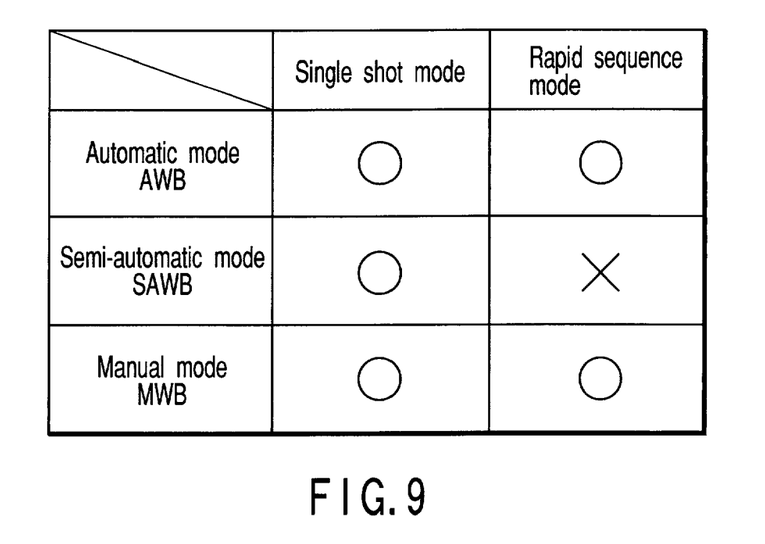
FIG. 9 is a view showing combinations of WB adjusting modes and single shot/rapid sequence modes.

FIG. 9 is a view showing combinations between the WB adjustment modes and single shot and rapid sequence modes. In the Figure, the symbol ○ represents an available combination and the symbol × represents no available combination.

According to the present embodiment, as shown in FIG. 9, the setting of the semi-automatic mode is inhibited if the rapid sequence mode is set. That is, in the case of the rapid sequence mode, a continuous image capturing operation is done and the semi-automatic mode is not suitable because the continuous operation is temporarily interrupted. For this reason, this combination is initially inhibited by using the process of issuing a warning, changing the setting to the automatic mode and so on. By doing so it is possible to prevent any erroneous setting.

Further, the present invention can be applied to a digital camera having the function of transmitting a captured image to an outside through the wireless communication function or wired communication function. In the case of setting the semi-automatic mode on such digital camera, no recording operation is performed until the user performs an OK operation and hence a final capturing image is confirmed. And the transmit function is also temporarily inhibited.

It is to be noted that the above-mentioned respective embodiment is not restricted thereto and various changes or modifications of the present invention can be made without departing from the essence of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
   an image pickup section configured to capture a subject image;
   an adjustment value creating section configured to create an adjustment value for adjusting a white balance of the captured image; and
   an adjusting section configured to adjust the white balance of the image based on the adjustment value output from the adjustment value creating section;
   wherein the adjustment value creating section comprises:
      a calculating section configured to automatically calculate a first adjustment value, based on image data obtained by capturing the subject image, after the subject image is captured to be recorded on a recording medium;
      an evaluating section configured to determine a reliability of the first adjustment value and to evaluate the determined reliability;
      an adjustment value correcting section configured: (i) to notify that correction of the first adjustment value via an operation instruction is enabled, and to create a second adjustment value based on an operation instruction for changing the first adjustment value, when the evaluating section evaluates that the reliability of the automatically calculated first adjustment value is low, and (ii) to immediately compress and record the image data based on the first adjustment value without changing the first adjustment value and without notifying that correction of the first adjustment value is enabled, when the evaluating section evaluates that the reliability of the automatically calculated first adjustment value is high; and an adjustment value outputting section configured to output the second adjustment value to the adjusting section.

2. A digital camera according to claim 1, further comprising:
a confirming section configured to confirm the second adjustment value by an input; and
a recording section configured to record image data adjusted based on the confirmed second adjustment value onto the recording medium.

3. A digital camera according to claim 2, further comprising:
a correction displaying section configured to display on a same screen, when the evaluating section evaluates that the reliability of the first adjustment value is low, an image adjusted based on the first adjustment value and an operation instruction for correcting the first adjustment value.

4. A digital camera according to claim 3, wherein the correction displaying section comprises an updating section configured to update and display an image adjusted based on the corrected adjustment value each time the first adjustment value is corrected.

5. A digital camera according to claim 1, further comprising:
a confirming section configured to confirm the second adjustment value by an input; and
a transmitting section configured to transmit image data, which is adjusted based on the confirmed second adjustment value, to an external destination through at least one of wireless communication and wired communication.

6. A digital camera according to claim 5, further comprising:
a correction display section configured to display on a same screen the adjusted image based on the first adjustment value and an operation instruction for correcting the first adjustment value, when the evaluating section evaluates that the reliability of the first adjustment value is low.

7. A digital camera according to claim 6, wherein the correction display section comprises an updating section configured to update and display an image adjusted based on the corrected adjustment value each time the first adjustment value is corrected.

8. A digital camera according to claim 1, further comprising:
a correction displaying section configured to display on a same screen an image adjusted based on the first adjustment value and an operation instruction for correcting the first adjustment value, when the evaluating section evaluates that the reliability of the first adjustment value is low.

9. A digital camera according to claim 8, wherein the correction displaying section comprises an updating section configured to update and display an image adjusted based on the corrected adjustment value each time the first adjustment value is corrected.

10. A digital camera according to claim 1, further comprising:
a transmitting section configured to transmit the image data, which is adjusted based on the first adjustment value outputted by the calculated adjustment value outputting section, to an external destination through at least one of wireless communication and wired communication.

11. A digital camera according to claim 1, further comprising:
a setting section configured to set a rapid sequence mode; and
an inhibiting section configured to, when the rapid sequence mode is set, inhibit operation of the adjustment value correcting section.

12. A digital camera comprising:
an image pickup section configured to capture a subject image;
a first storing section configured to temporarily store image pickup data obtained by capturing the subject image;
a creating section configured to create automatically a first white balance adjustment value based on the captured image data after the subject image is captured to be recorded on a recording medium;
a second storing section configured to temporarily store processed image data that has been processed using the first white balance adjustment value;
an operating section configured to perform fine adjustment of the first white balance adjustment value;
an evaluating section configured to determine a reliability of the first white balance adjustment value and to evaluate the determined reliability;
a control section configured: (i) to immediately process and store in the second storing section image data read out from the first storing section that is processed using the first white balance adjustment value without changing the first white balance adjustment value with the operating section, when the evaluating section evaluates that the reliability of the first white balance adjustment value is high, and (ii) to create a second white balance adjustment value based on an operation of the operating section, process the image data read out from the first storing section using the second white balance adjustment value, and store the processed image data in the second storing section, when the evaluating section evaluates that the reliability of the first white balance adjustment value is low;
a confirming section configured to confirm the second white balance adjustment value created by the operation of the operating section; and
an outputting section configured to, when the second white balance adjustment value is confirmed by the confirming section, output the image data stored in the second storing section that has been processed using the second white balance adjustment value to the recording medium.

13. A white balance adjusting method comprising:
capturing a subject image;
creating an adjustment value for adjusting a white balance of the image; and
adjusting the white balance of the image based on the adjustment value;
wherein creating the adjustment value comprises:
automatically calculating a first adjustment value based on image data obtained by capturing the subject image, after the subject image is captured to be recorded on a recording medium;
determining a reliability of the first adjustment value and evaluating the determined reliability;
notifying that correction of the first adjustment value via an operation instruction is enabled, and creating a second adjustment value based on an operation instruction for changing the first adjustment value, when it is evaluated that the reliability of the automatically created first adjustment value is low;

immediately compressing and recording the image data based on the first adjustment value, without changing the first adjustment value and without notifying that correction of the first adjustment value is enabled, when it is evaluated that the reliability of the automatically calculated first adjustment value is high; and outputting the second adjustment value for adjusting the white balance.

14. A white balance adjusting method according to claim 13, further comprising:

confirming the second adjustment value according to an operation; and recording image data which is adjusted based on the confirmed second adjustment value onto the recording medium.

15. A white balance adjusting method according to claim 14, wherein creating the adjustment value further comprises:

displaying on a same screen an image adjusted based on the first adjustment value and an operation instruction for correcting the first value, when it is evaluated that the reliability of the first adjustment value is low; and updating and displaying an image adjusted based on the corrected adjustment value each time the first adjustment value is corrected.

16. A white balance adjusting method according to claim 13, wherein creating the adjustment value further comprises:

displaying on a same screen an image adjusted based on the first adjustment value and an operation instruction for correcting the first value, when it is evaluated that the reliability of the first adjustment value is low; and updating and displaying an image adjusted based on the corrected adjustment value, at each variation of the first adjustment value.

17. A white balance adjusting method comprising:

capturing a subject image;

temporarily storing, in a first storing section, image data which is obtained by capturing the subject image;

automatically creating a first white balance adjustment value based on the captured image data after the subject image is captured to be recorded on a recording medium;

temporarily storing, in a second storing section, image data that has been processed using the first white balance adjustment value;

determining a reliability of the first white balance adjustment value and evaluating the determined reliability;

performing fine adjustment of the first white balance adjustment value;

immediately processing and storing in the second storing section image data read out from the first storing section that is processed using the first white balance adjustment value, without performing the fine adjustment of the first white balance adjustment value, when it is evaluated that the reliability of the first adjustment value is high;

creating a second white balance adjustment value based on the fine adjustment of the first white balance adjustment value, and processing the image data read out from the first storing section using the second white balance adjustment value and storing the processed image data, when it is evaluated that the reliability of the first adjustment value is low;

confirming the second white balance adjustment value; and outputting to the recording medium the image data stored in the second storage section that has been processed using the second white balance adjustment value, when the second white balance adjustment value is confirmed in the confirming step.

* * * * *